(12) United States Patent  
Shimamoto et al.

(10) Patent No.: US 11,144,802 B1  
(45) Date of Patent: Oct. 12, 2021

(54) IMAGE PROCESSING APPARATUS, IMAGE FORMING APPARATUS, AND IMAGE PROCESSING METHOD FOR EFFECTIVELY UTILIZING STORAGE CAPACITY OF RING BUFFER

(71) Applicant: KYOCERA Document Solutions Inc., Osaka (JP)

(72) Inventors: Kunihiko Shimamoto, Torrance, CA (US); Norifumi Miyahara, Torrance, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/163,452

(22) Filed: Jan. 31, 2021

(51) Int. Cl.  
*G06K 15/02* (2006.01)

(52) U.S. Cl.  
CPC ..... *G06K 15/1817* (2013.01); *G06K 15/1865* (2013.01); *G06K 15/1886* (2013.01)

(58) Field of Classification Search  
CPC .......... G06K 15/1817; G06K 15/1865; G06K 15/1886  
See application file for complete search history.

(56) References Cited

U.S. PATENT DOCUMENTS

| 8,382,223 | B2 | 2/2013 | Yokoyama et al. | |
| 9,875,192 | B1 * | 1/2018 | Allen | G06F 12/122 |
| 2001/0002078 | A1 * | 5/2001 | Kakigi | B65H 31/10 271/292 |
| 2003/0231320 | A1 * | 12/2003 | Tsunekawa | G06K 15/1822 358/1.2 |
| 2010/0060936 | A1 * | 3/2010 | Shitara | G06T 11/60 358/1.18 |
| 2012/0084520 | A1 * | 4/2012 | Chou | G06F 11/1484 711/162 |
| 2015/0242720 | A1 * | 8/2015 | Kitaguchi | H04N 1/32358 358/1.13 |
| 2015/0339546 | A1 * | 11/2015 | Ito | G06K 15/181 358/1.15 |
| 2016/0088189 | A1 * | 3/2016 | Atsumi | H04N 1/2104 358/1.17 |
| 2018/0196732 | A1 * | 7/2018 | Dolev | G06F 9/45558 |

* cited by examiner

*Primary Examiner* — Nicholas Pachol  
(74) *Attorney, Agent, or Firm* — Hawaii Patent Services; Nathaniel K. Fedde; Kenton N. Fedde

(57) ABSTRACT

Provided is an image processing apparatus that utilizes the storage capacity of a ring buffer. A ring buffer is set in the storage unit. A page area setting unit allocates a maximum size page area in page units of the job in the ring buffer set in the storage unit. A band storing unit stores band data while compressing the band data in the page area allocated by the page area setting unit. An image processing unit performs image processing of the band data stored by the band storing unit. Then, the page area setting unit determines whether or not the page has high possibility to be reused, and when the page has high possibility to be reused, the page area setting unit allocates the page area at the head of the ring buffer.

12 Claims, 8 Drawing Sheets

IMAGE PROCESSING APPARATUS, IMAGE FORMING APPARATUS, AND IMAGE PROCESSING METHOD FOR EFFECTIVELY UTILIZING STORAGE CAPACITY OF RING BUFFER

BACKGROUND

The present disclosure relates to an image processing apparatus, an image forming apparatus, and an image processing method, and more particularly to an image processing apparatus, an image forming apparatus, and an image processing method capable of printing band data.

There is an image forming apparatus such as a multifunctional peripheral (MFP) capable of printing documents and images.

As a typical image forming apparatus, a technology that manages in a certain block unit or in a ring buffer in order to perform printing without causing print defects even when the remaining amount of the ink cartridge is low is disclosed. In this technology, it is not necessary to store all the image data for one job in the ring buffer.

SUMMARY

An image processing apparatus according to the present disclosure includes a storage unit configured to be set with a ring buffer; a page area setting unit configured to allocate a maximum-sized page area for each page of a job in the ring buffer set in the storage unit; a band storing unit configured to store band data while compressing in the page area allocated in the page area setting unit; and an image processing unit configured to perform image processing of the band data stored by the band storing unit; wherein the page area setting unit determines whether or not the page has high possibility to be reused, and when having the high possibility to be reused, allocates the page area at a head of the ring buffer.

An image forming apparatus according to the present disclosure includes a storage unit configured to be set with a ring buffer; a page area setting unit configured to allocate a maximum-sized page area for each page of a job in the ring buffer set in the storage unit; a band storing unit configured to store band data while compressing in the page area allocated in the page area setting unit; an image processing unit configured to perform image processing of the band data stored by the band storing unit; and an image forming unit configured to form an image of the band data performed image processing by the image processing unit; wherein the page area setting unit determines whether or not the page has high possibility to be reused, and when having the high possibility to be reused, allocates the page area at a head of the ring buffer.

An image processing method of the present disclosure is an image processing method being executed by an image processing apparatus and including the steps of: setting a ring buffer; allocating a maximum-sized page area for each page of a job in the ring buffer that is set; determining whether or not the page has high possibility to be reused, and when having the high possibility to be reused, allocating the page area at the head of the ring buffer; storing band data while compressing in the page area that is allocated; and performing image processing of the band data that is stored.

DETAILED DESCRIPTION

Embodiment

Figure 1:
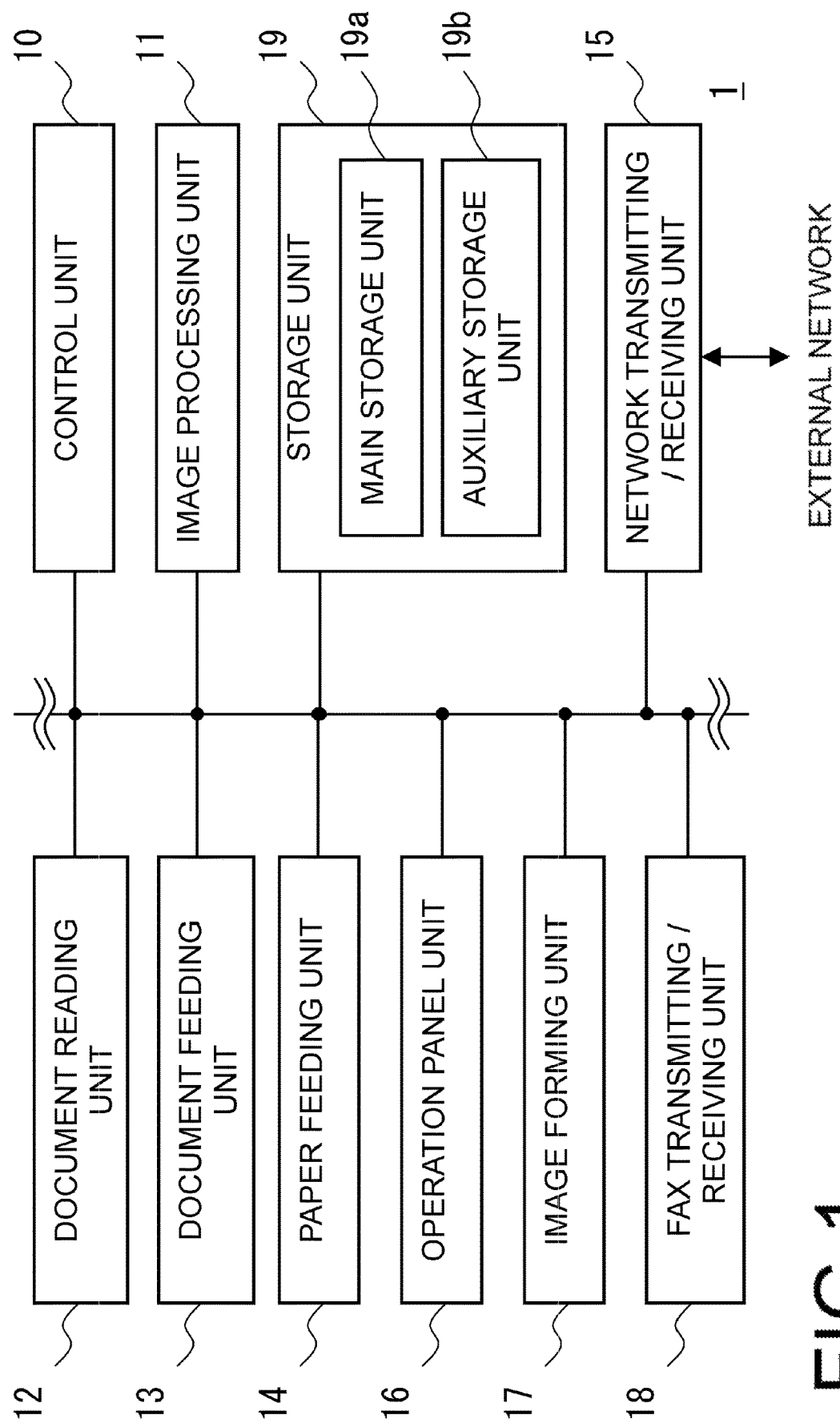
FIG. 1 is a block diagram showing a control configuration of an image forming apparatus according to an embodiment of the present disclosure.

[Control Configuration of Image Forming Apparatus 1] At first, with reference to FIG. 1, a system configuration of an image forming apparatus 1 according to an embodiment of the present disclosure will be described.

The image forming apparatus 1 includes an image processing unit 11, a document reading unit 12, a document feeding unit 13, a paper feeding unit 14, a network transmitting/receiving unit 15, an operation panel unit 16, an image forming unit 17, a FAX transmitting/receiving unit 18, and a storage unit 19, or the like, are included. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), or the like.

The control unit 10 reads the control program stored in the ROM or HDD of the storage unit 19, expands the control program in the RAM, and executes the control program to operate as each unit of the functional blocks as described later. Further, the control unit 10 controls the entire apparatus in response to an indication information input from an external terminal or the operation panel unit 16.

The image processing unit 11 is a control calculation unit such as an ASIC (Application Specific Integrated Circuit), a DSP (Digital Signal Processor), a GPU (Graphics Processing Unit), or the like, dedicated to image processing. The image processing unit 11 performs image processing the image data. The image processing may be processing such as scaling, density adjustment, gradation adjustment, image improvement, or the like.

Further, the image processing unit 11 stores the image, which is read by the document reading unit 12, in the storage unit 19 as print data. At this time, the image processing unit 11 can also convert the print data into a file of an electronic document such as PDF or the like, or an image data such as TIFF or the like. Further, the image processing unit 11 may be capable of executing at least a part of OCR (Optical Character Recognition) processing.

The document reading unit 12 reads the set document. Further, the document reading unit 12 is arranged above the main body of the image forming apparatus 1.

The document reading unit 12 includes a scanner, a platen glass, and a document reading slit. When reading a document placed on the platen glass, the document reading unit 12 moves the scanner to a position facing the platen glass and reads the document placed on the platen glass while scanning to obtain image data. Then, the acquired image data is output to the control unit 10.

Further, when reading the document fed from the document feeding unit 13, the document reading unit 12 moves the scanner to a position facing the document reading slit. Then, the document reading unit 12 reads the document through the document reading slit in synchronism with the document feeding operation by the document feeding unit 13 and acquires image data. The document reading unit 12 outputs the acquired image data to the control unit 10.

The document feeding unit 13 conveys a document read by the document reading unit 12. The document feeding unit 13 is arranged above the document reading unit 12.

The document feeding unit 13 includes a document placing unit and a document transport mechanism. The document feeding unit 13 sequentially feeds the documents placed on the document placing unit one by one by a document feeding mechanism and feeds the documents to the document reading unit 12.

The paper feeding unit 14 feeds the recording sheet one by one toward the image forming unit 17. The paper feeding unit 14 is provided in the main body.

The network transmitting/receiving unit 15 is a network connecting unit including a LAN board for connecting to an external network, a wireless transceiver, and the like. The external network of this embodiment is, for example, a LAN, a wireless LAN, a WAN, a mobile telephone network, a voice telephone network, or the like. The network transmission/reception unit 15 transmits/receives data via a data communication line and transmits/receives a voice signal via a voice telephone line.

The operation panel unit 16 includes an input unit such as a button, a touch panel, and the like, and a display unit such as an LCD (Liquid Crystal Display), an organic EL display, and the like. The operation panel unit 16 is arranged on the front side of the image forming apparatus 1.

The buttons on the input unit of the operation panel unit 16 are a numeric pad, buttons for starting, canceling, switching operation modes, issuing instructions regarding job execution, or the like. The operation mode may include a mode such as copying, fax transmission, scanner, network scanner, and the like. Further, the job includes printing, transmitting, saving, recording, or the like, for the selected document. The input unit of the operation panel unit 16 acquires instructions of various jobs of the image forming apparatus 1 by the user. Moreover, inputting and changing the information of each user according to the user's instruction acquired from the operation panel unit 16 can be performed.

The image forming unit 17 causes an image to be formed on a recording sheet from data stored in the storage unit 19, read by the document reading unit 12, or acquired from an external terminal according to a user's output instruction.

The image forming unit 17 includes a photosensitive drum, an exposure unit, a development unit, a transfer unit, a fixing unit, and the like. The image forming unit 17 records a toner image on a recording sheet by executing an image forming process including charging, exposing, developing, transferring, and fixing.

The FAX transmitting/receiving unit 18 transmits/receives a facsimile. The FAX transmitting/receiving unit 18 can receive a facsimile from another FAX apparatus via a voice line, stores it in the storage unit 19, and causes the image forming unit 17 to form an image. Further, the FAX transmitting/receiving unit 18 can convert a document read by the document reading unit 12 or data of a network FAX transmitted from an external terminal into image data and can be facsimile-transmitted to another FAX apparatus via a voice line.

The storage unit 19 is a non-transitory recording medium.

In this embodiment, the storage unit 19 includes a main storage unit 19a and an auxiliary storage unit 19b.

The main storage unit 19a is a main storage such as various RAMS such as DRAM (Dynamic Random Access Memory) and SRAM (Static Random Access Memory). The main storage unit 19a stores programs, data, temporary files, buffer data, and the like. The DRAM of the main storage unit 19a may retain the stored contents by a function such as self-refreshing even in the power saving state.

The auxiliary storage unit 19b is an auxiliary storage such as a ROM (Read Only Memory), an HDD (Hard Disk Drive), and an SSD (Solid State Drive). The auxiliary storage unit 19b may have a larger storage capacity than the main storage unit 19a. Further, the auxiliary storage unit 19b stores a control program for controlling the operation of the image forming apparatus 1. The control program includes an OS (Operating System) and application software for printing or the like (hereinafter simply referred to as "application"). Further, the document data is also temporarily stored in the auxiliary storage unit 19b. In addition, in the storage unit 19, the account setting of the user is also stored. Further, the storage unit 19 may include a storage folder area for each user (hereinafter referred to as "document box"). In addition, the auxiliary storage unit 19b may include a storage class memory that is slower than the main storage unit 19a but has a larger capacity and a higher speed than an HDD, or the like.

In the image forming apparatus 1, the control unit 10 and the image processing unit 11 may be integrally-formed, such as a CPU with a GPU, a chip-on-module package, or an SOC (System On a Chip).

Further, the control unit 10 and the image processing unit 11 may be configured integrally with the storage unit 19 or may each include a recording medium such as a RAM or a ROM.

[Functional Configuration of Image Forming Apparatus 1]

Figure 2:
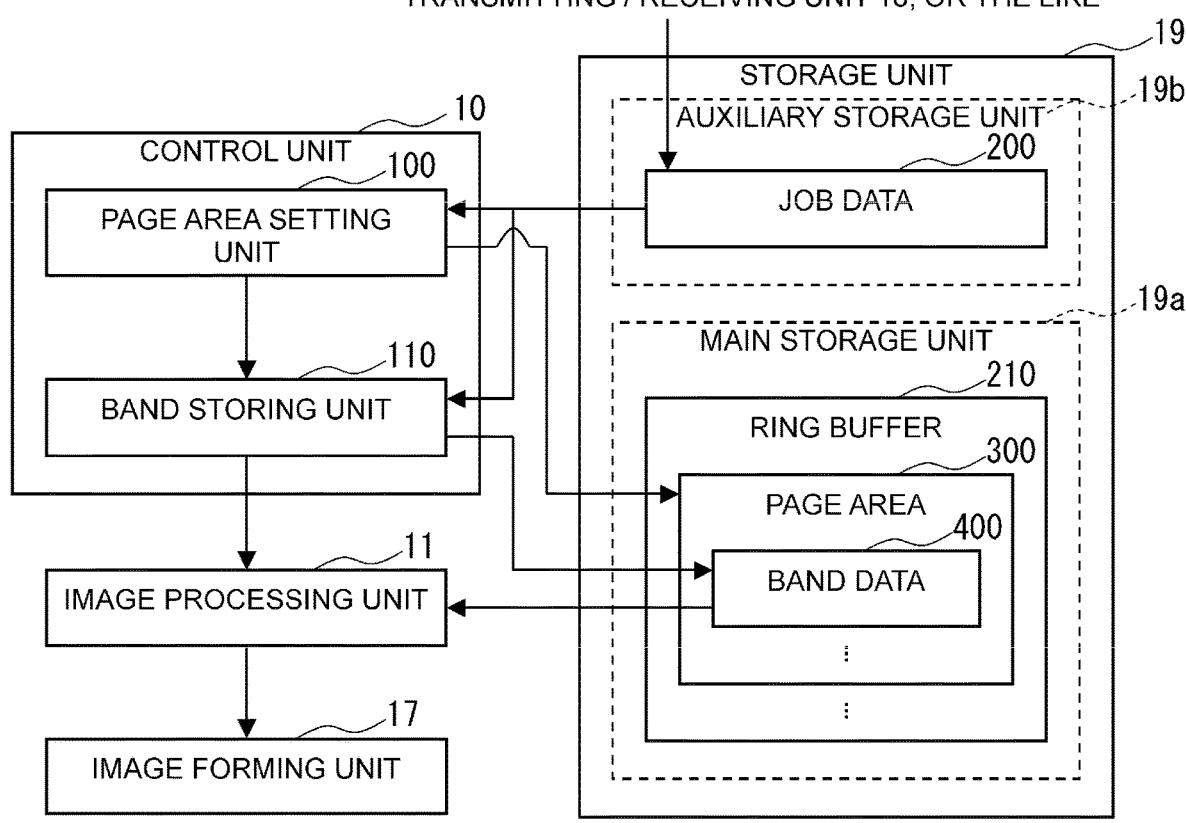
FIG. 2 is a block diagram showing a functional configuration of the image forming apparatus according to the embodiment of the present disclosure.

Here, the functional configuration of the image forming apparatus 1 will be described with reference to FIG. 2.

The control unit 10 of the image forming apparatus 1 includes a page area setting unit 100 and a band storing unit 110.

In the main storage unit 19a of the storage unit 19, a ring buffer 210 is set. The auxiliary storage unit 19b stores job data 200.

The page area setting unit 100 allocates a maximum size page area 300 in a page unit of a job in the ring buffer 210 set in the storage unit 19. Then, the page area setting unit 100 determines whether or not the page has high possibility to be reused, and if the page has high possibility to be reused, the page area setting unit 100 allocates the page area 300 at the head (the beginning address) of the ring buffer 210. At this time, the page area setting unit 100 can determine that there is a high possibility to be reused if the copy printing is set for the job. The copy printing for printing of this embodiment is a print setting such as printing a plurality of copies for one job, or the like. When printing a plurality of copies, pages may be sorted, or the like. Here, the page area setting unit 100 may wait until the head of the ring buffer 210 is released when the head is in use although being determined that the possibility to be reused is high.

The band storing unit 110 stores the band data 400 while compressing in the page area 300 allocated in the page area setting unit 100. At this time, the band storage unit 110 compresses the image data for each page based on the job data 200 in band units. In the present embodiment, the band indicates that the image data for each page is divided for efficient processing by the image processing unit 11.

In the present embodiment, the image processing unit 11 performs image processing of the band data 400 stored by the band storing unit 110.

The image forming unit 17 forms an image of the band data 400 image-processed by the image processing unit 11.

The ring buffer 210 is a buffer that stores image data for the image processing unit 11 to perform image processing while printing. In the present embodiment, the ring buffer 210 has a specific capacity allocated in the memory space, and the page area 300 is allocated in page units from the head (beginning) to the end. Further, in the ring buffer 210, when a page area 300 having a capacity larger than the capacity from the reservation start position to the reservation end position is needed, the old page area 300 is released in order and a new page area 300 is allocated. As a result, the ring buffer 210 stores each page area 300 in a ring shape. In each of the allocated page areas 300, the compressed band data 400 is stored in band units. Regarding the reservation of the page area 300 and the band data 400, for example, the address in the memory space and the allocated state are set in the memory management table for the OS or the print application.

The job data 200 is data of a job processed by the image forming apparatus 1. In the present embodiment, the job data 200 uses data of jobs such as printing, copying, facsimile reception, network facsimile reception, or the like. These are jobs in which the image forming unit 17 forms an image. In the present embodiment, the job data 200 is various types of uncompressed or compressed image data or various types of document data. Specifically, the various types of document data may be, for example, an electronic document file such as PDL (Page Description Language), PS (Post Script (R)), PDF (Portable Document Format), and the like, structured document files such as XML (Extensible Markup Language), HTML (Hyper Text Markup Language), and the like, application files for word processors, spreadsheet software, presentation software, or the like, a plain text file, or the like.

Here, the control unit 10 of the image forming apparatus 1 is caused to function as the page area setting unit 100 and the band storing unit 110 by executing the control program stored in the storage unit 19.

Further, each unit of the above-described image forming apparatus 1 becomes a hardware resource that executes the image processing method of the present disclosure.

In addition, the page area setting unit 100 and the band storing unit 110 can be configured by the image processing unit 11 for some or all of the functions. Further, a part or an arbitrary combination of the above-described functional configurations may be configured by an IC, a programmable logic, an FPGA (Field-Programmable Gate Array), or the like, in terms of hardware or a circuit.

[Image Processing for Printing by the Image Forming Apparatus 1]

Next, with reference to FIGS. 3 to 6, the image processing for printing by the image forming apparatus 1 according to the embodiment of the present disclosure is to be described.

In the image processing for printing of the present embodiment, mainly, the control unit 10 and the image processing unit 11 execute the control program stored in the storage unit 19 or the control program stored in the image processing unit 11 in cooperation with each unit by using hardware resources.

Figure 3:
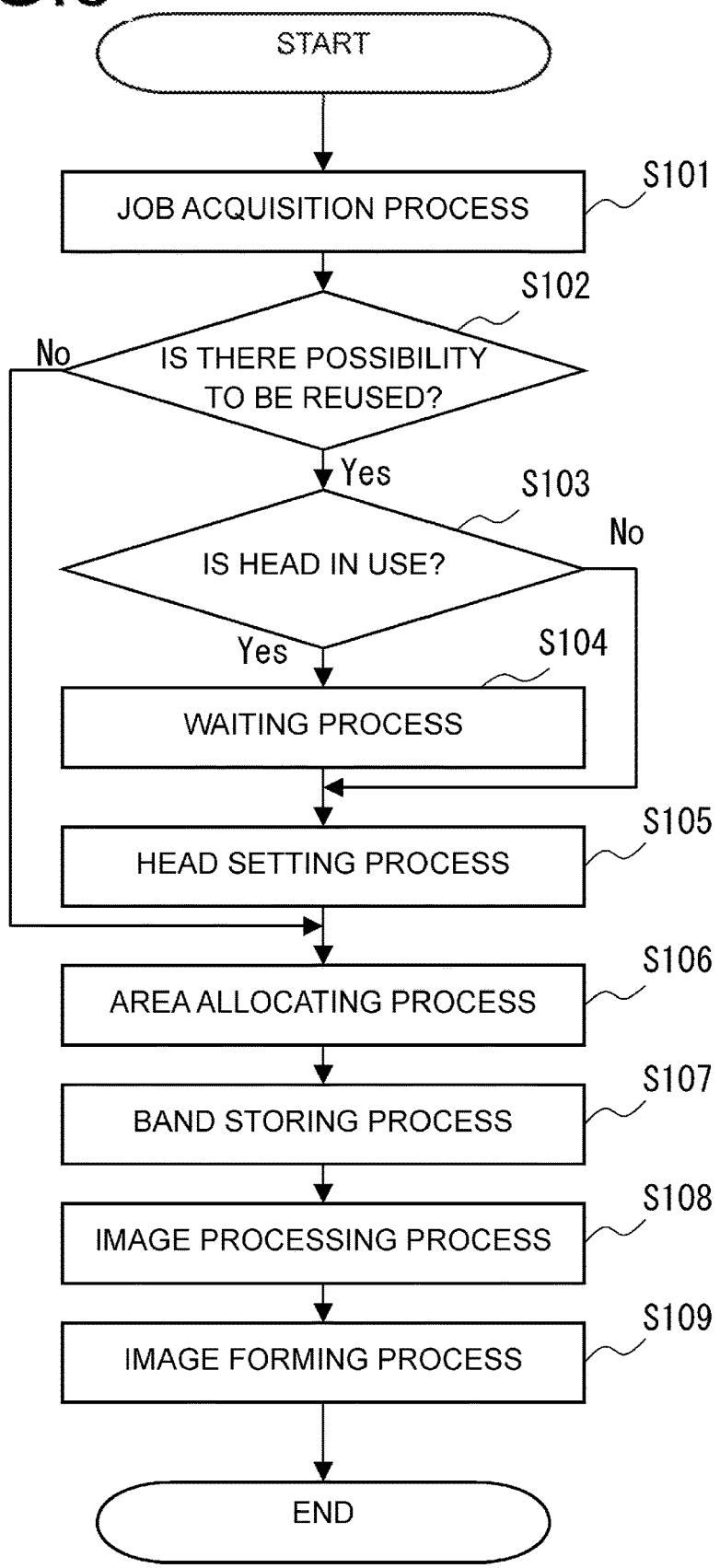
FIG. 3 is a flowchart of imaging process for printing according to the embodiment of the present disclosure.

Hereinafter, the details of the imaging process for printing is described step by step with reference to the flowchart of FIG. 3.

(Step S101)

At first, the page area setting unit 100 performs a job acquisition process. When copying is instructed on the operation panel unit 16 and the document is read by the document reading unit 12, the page area setting unit 100 acquires this image data as the job data 200. Otherwise, the page area setting unit 100 acquires the facsimile image data received by the FAX transmitting/receiving unit 18 as the job data 200.

Alternatively, the page area setting unit 100 acquires document data from a PC (Personal Computer) or the other terminal via the network transmitting/receiving unit 15, from a USB (Universal Serial Bus) memory, via a short-range wireless communication, or the like. The page area setting unit 100 acquires this document data as job data 200. In addition, the page area setting unit 100 may be acquired a document data stored in an external server or a document box as the job data 200.

The page area setting unit 100 analyzes the acquired job data 200, generates image data in page units, and stores the image data in the auxiliary storage unit 19*b*. When the job data 200 is document data, the page area setting unit 100 draws (renders) it in page units and acquires image data in page units. Further, the image data in page units may be included in the job data 200, even if it is a separate file associated with the job data 200.

In addition, the page area setting unit 100 also sets, in the job data 200, instruction information indicating what kind of printing is to be performed. This instruction information is set based on the type of the job data 200, the metadata of the document data, the instruction from the operation panel unit 16 or the PC, the account setting of the user, and the like. Specifically, the instruction information includes settings such as copy printing, color printing, monochrome (black and white) printing, single color printing, aggregate printing, poster printing, other format settings, a watermark, and the like.

(Step S102)

Next, the page area setting unit 100 determines whether the page area 300 has high possibility to be reused or not. The page area setting unit 100 refers to the instruction information of the job data 200, for example, and if the copy printing is set, determines yes because the page area 300 has high possibility to be reused. Also, the page area setting unit 100 may refer to the state information of the image forming apparatus 1 and may determine Yes if printing is stopped due to a paper jam, or the like. The page area setting unit 100 determines No in other cases.

In the case of Yes, the page area setting unit 100 advances the process to step S103.

In the case of No, the page area setting unit 100 advances the process to step S106.

(Step S103)

If the page area 300 has high possibility to be reused, the page area setting unit 100 determines whether the head of the ring buffer 210 is in use or not. The page area setting unit 100 determines Yes if the head address of the ring buffer 210 is used by another job, or the like. The page area setting unit 100 determines No in other cases.

In the case of Yes, the page area setting unit 100 advances the process to step S104.

In the case of No, the page area setting unit 100 advances the process to step S105.

(Step S104)

If the head is in use, the page area setting unit 100 performs a waiting process.

Although the head of the ring buffer 210 is in use while the page area setting unit 100 determines that having high possibility to be reused, the page area setting unit 100 waits until the area including the head address is released. Whether or not this has been released may be determined by referring to the memory management table of the OS or the printing application.

(Step S105)

Here, the page area setting unit 100 performs head setting process.

The page area setting unit 100 sets the address in the memory space of the main storage unit 19a for allocating the page area 300 at the head of the ring buffer 210.

(Step S106)

Next, the page area setting unit 100 performs area allocating process.

The page area setting unit 100 allocates the page area 300 having the maximum size in page units. This maximum size is, for example, the capacity when the compression rate becomes the lowest when all the band data 400 of the page are compressed. That is, this size may be calculated as the maximum capacity on the algorithm when it is the least compressible. Specifically, the maximum size may be a capacity when the image data is not compressed, a maximum capacity including data such as a tag for compression, and the like. Further, as described above, the page area setting unit 100 allocates the page area 300 of the first page from the head of the ring buffer 210 in the case of the copy printing.

In addition, the page area setting unit 100 may set "in use" in the memory management table when allocating the page area 300 of each page. Further, the page area setting unit 100 may set the ID and page number of the job data 200, the range of addresses in the allocated memory space, and the allocating time information in the memory management table.

At this time, if the page area setting unit 100 cannot allocate the page area 300 of the maximum size, it can release the page area 300 from the oldest allocated page. The page area setting unit 100 may also set this releasing in the memory management table.

Figure 4:
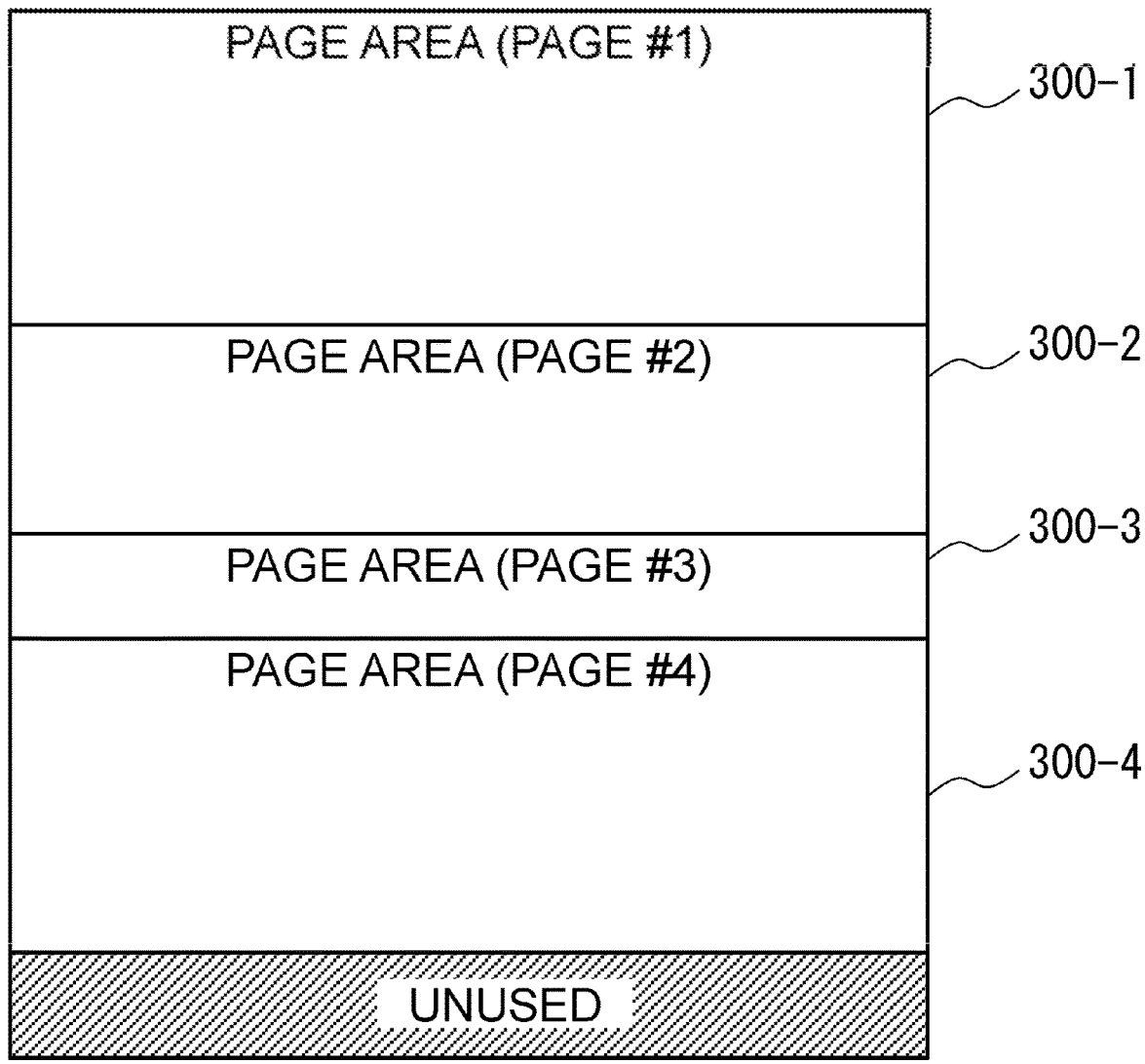
FIG. 4 is a conceptual diagram of the imaging process for printing as shown in FIG. 3.

FIG. 4 shows an example of the page area 300-1 to the page area 300-4 allocated in this way from the first page (Page #1) to the fourth page (Page #4). In this example, a portion on the memory space near the end on the ring buffer 210 is an unused area that is not in use.

(Step S107)

Next, the band storage part 110 performs a band storing process.

The band storing unit 110 reads out image data in page units of the job data 200 and divides it into band data 400. Then, the band storing unit 110 stores the band data 400 in the allocated page area 300 while compressing this band data 400.

Figure 5:
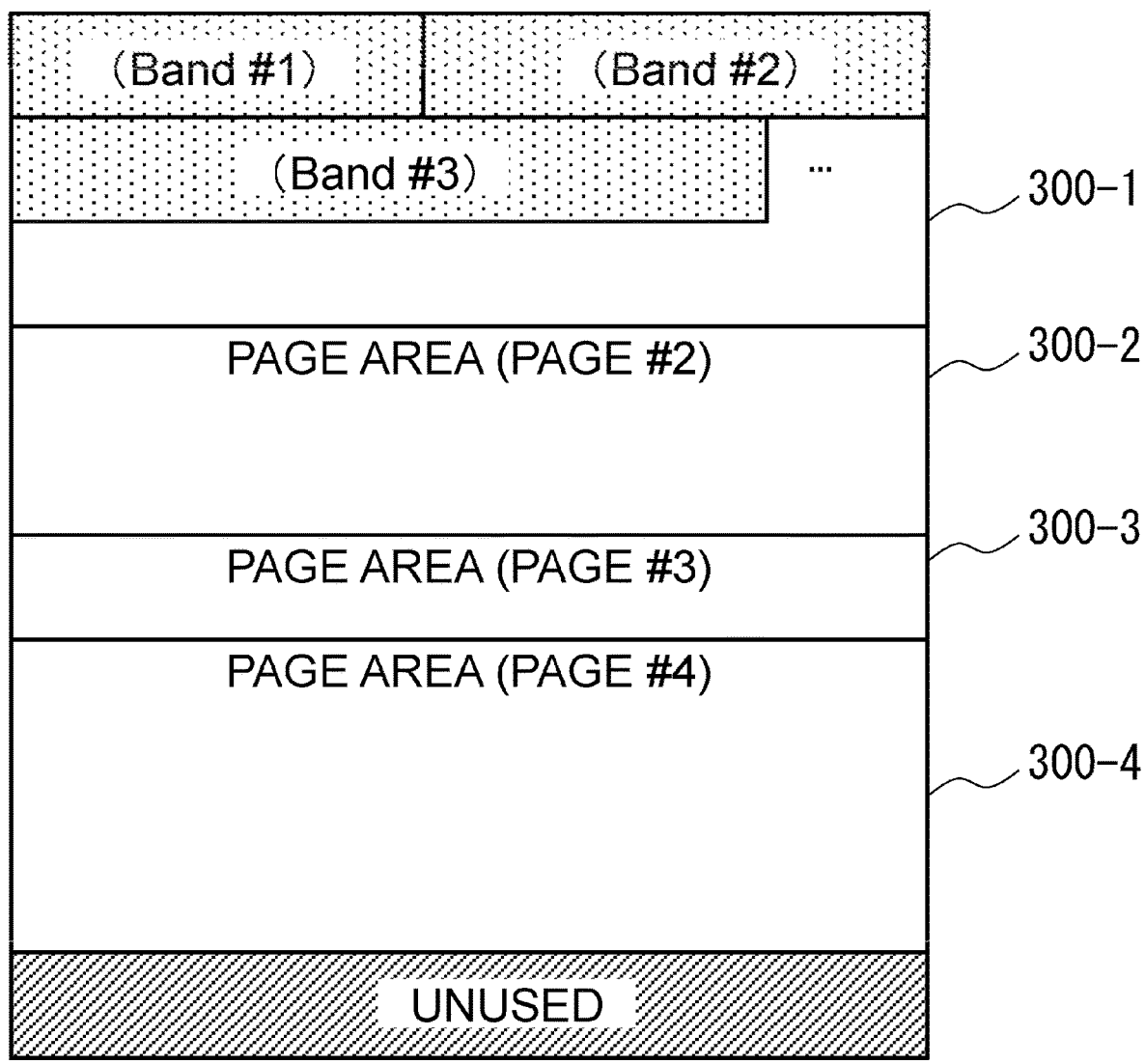
FIG. 5 is a conceptual diagram of the imaging process for printing as shown in FIG. 3.

FIG. 5 shows an example in which band data 400-1 (Band #1) to band data 400-3 (Band #3) are stored in the page area 300-1. These bands are compressed, and thus total size of the bands for the page is expected less size than the maximum size.

Figure 6:
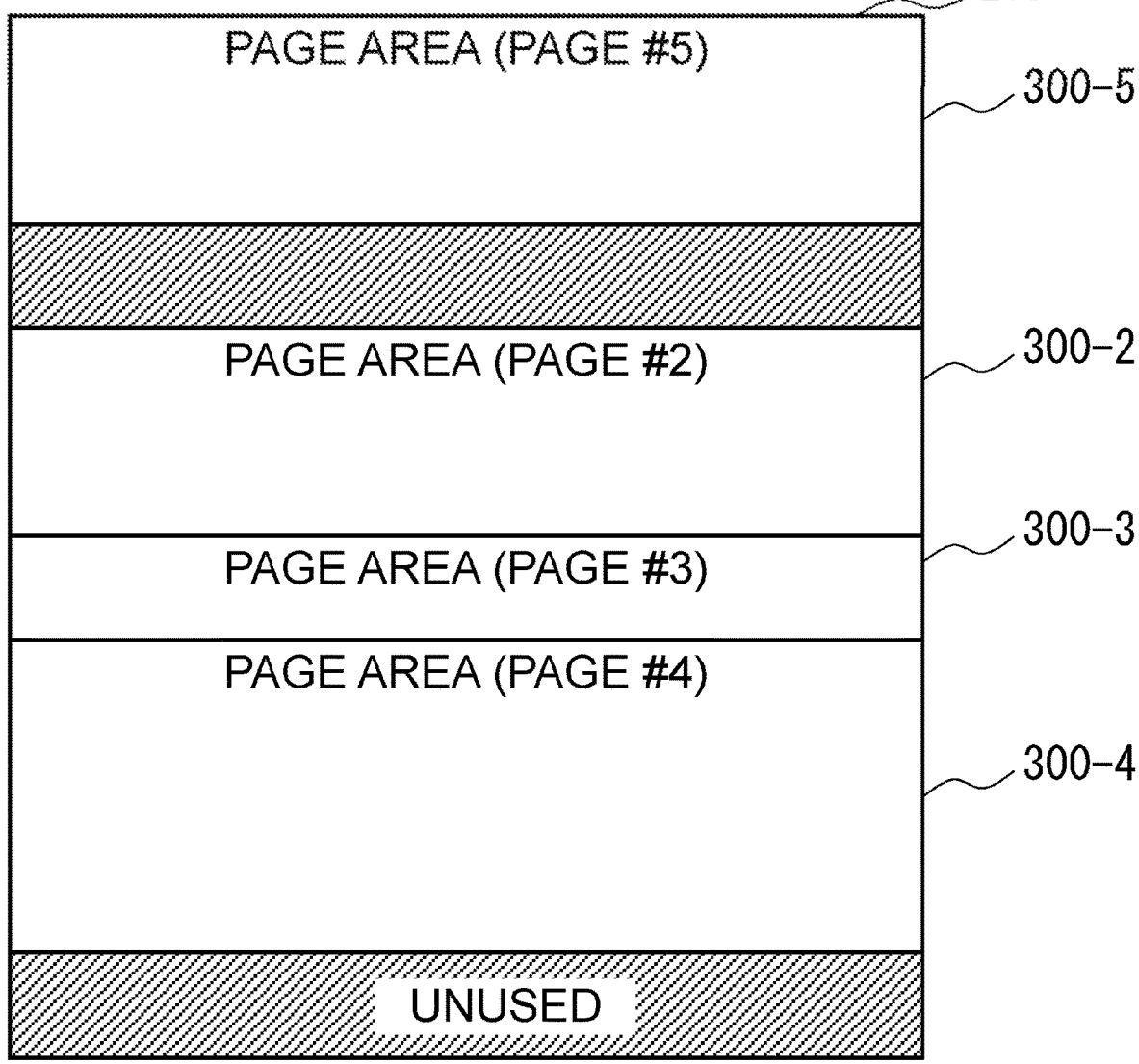
FIG. 6 is a conceptual diagram of the imaging process for printing as shown in FIG. 3.

FIG. 6 shows an example in which the processing of the first to fourth pages is completed, the first page (Page #1) is released, and the page area 300 of the fifth page (Page #5) is allocated.

(Step S108)

Next, the image processing unit 11 performs image processing process.

The image processing unit 11 sequentially performs image processing of the band data 400 stored in the page area 300 of the ring buffer 210. At this time, the image processing unit 11 can also decompress the compressed band data 400 to perform processing.

(Step S109)

Next, the image forming unit 17 and the page area setting unit 100 perform image forming process.

The image forming unit 17 forms an image of the band data 400 image-processed by the image processing unit for each page. As a result, an image corresponding to the band data 400 is formed on the recording sheet and printed out. Note that the band data 400 may be output after the document data is generated and transmitted by e-mail, or the like, facsimile transmission by the FAX transmitting/receiving unit 18, or storage in the document box.

The page area setting unit 100 releases the page area 300 for a page where the output has been completed. However, if the copy printing has been set, the page area setting unit 100 does not release the page area 300 unless all the copies have been set. Furthermore, when printing is stopped due to a paper jam, or the like, the page area setting unit 100 does not release the page area 300 for a specific period because there is a high possibility of reprinting.

With the above, the image processing for printing according to the embodiment of the present disclosure is completed.

With the above configuration, the following effects can be obtained.

In a typical image forming apparatus, a ring buffer may be used for the reason that printing is performed without causing print failure even when the remaining amount of the ink cartridge is low. However, such a ring buffer has a limited capacity and is required to be used efficiently.

Therefore, the present inventors have earnestly studied an image processing apparatus for more efficiently using the ring buffer and have obtained the following findings.

Specifically, in a case that the image forming apparatus performs copy printing, if the band data of all pages can be stored in the ring buffer of the main storage unit, printing is performed efficiently. That is, when if the image data is acquired from the HDD, or the like, of the auxiliary storage unit to the ring buffer, the band data that are performed the image processing are held in the ring buffer, and such the band data can be reused. However, when the band data of all pages cannot be stored in the ring buffer, to acquire the image from the auxiliary storage unit again and to perform image processing is required. As a result of intensive studies by the present inventors, when such a situation occurs, reading from the auxiliary storage unit and image processing may become a performance bottleneck.

Figure 7:
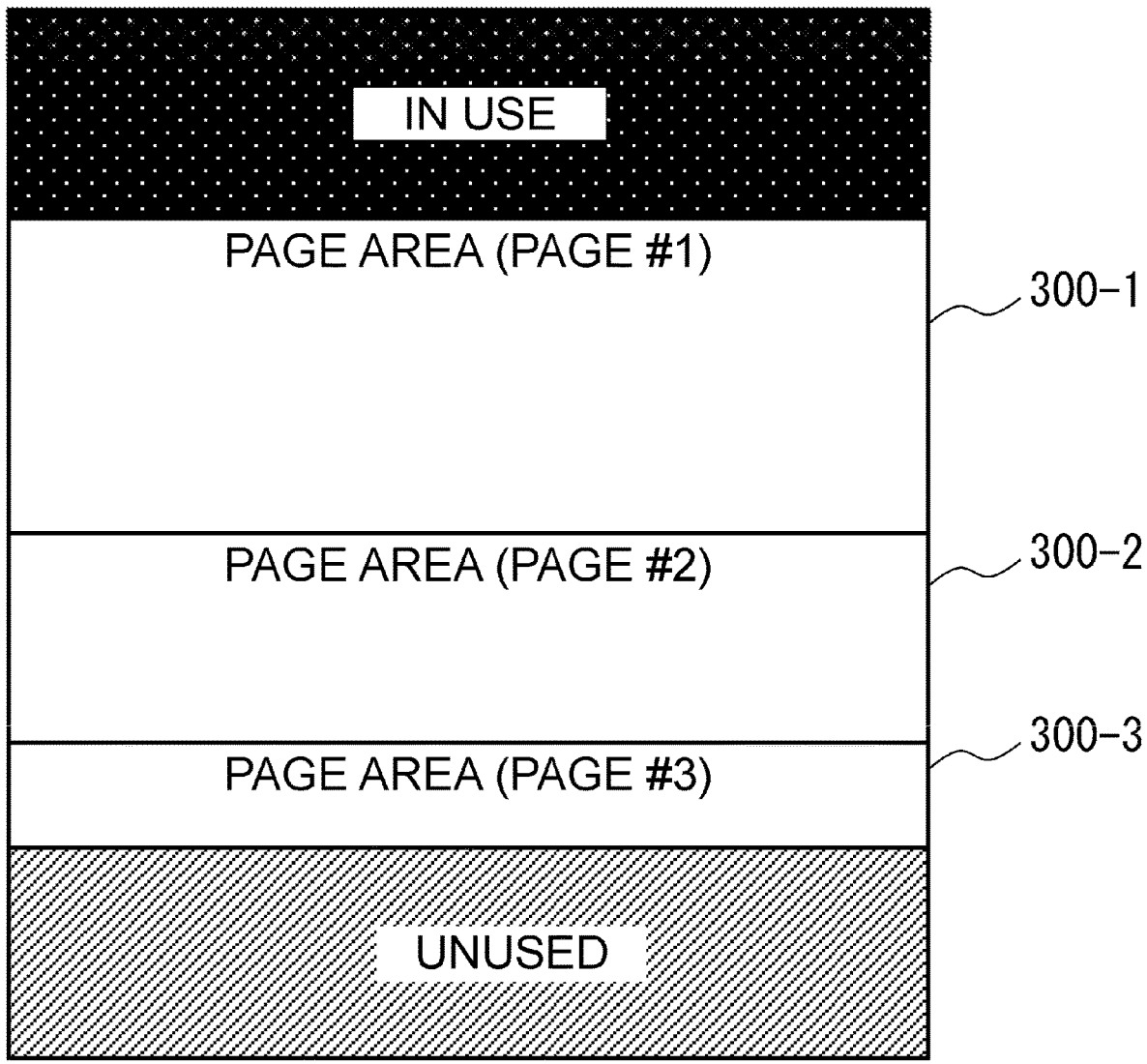
FIG. 7 is a conceptual diagram for explaining an inappropriate example according to the embodiment of the present disclosure.

Such a non-favorable situation is described with reference to a specific inappropriate example of FIG. 7. Consider a case where the head of the ring buffer 210 is in use due to the status of the preceding job, or the like, and the page area 300-1 of the first page (Page #1) is allocated from the middle. That is, FIG. 7 is an example of the case where the first page starts in the middle of the ring buffer 210.

Figure 8:
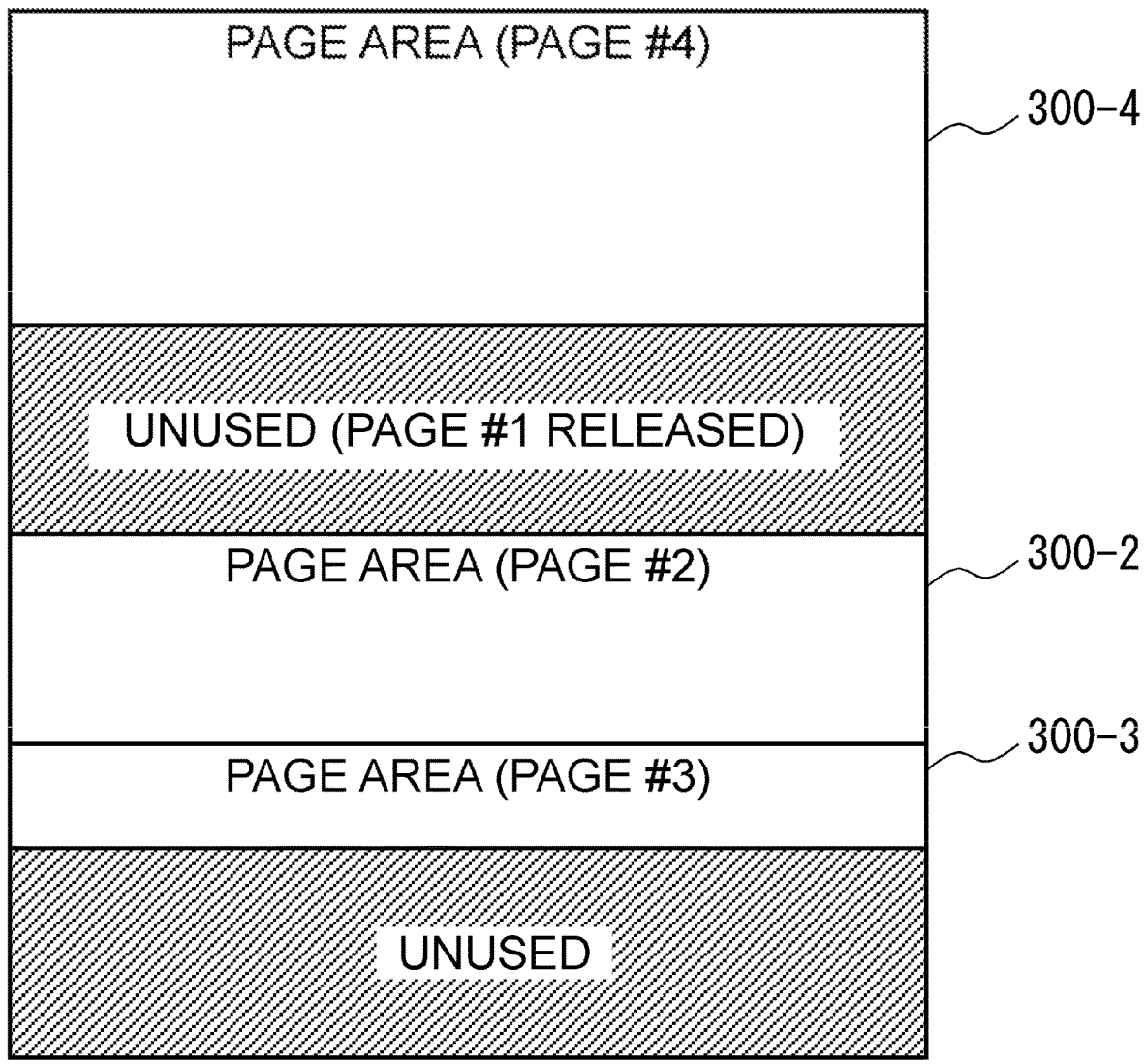
FIG. 8 is a conceptual diagram for explaining an example when page 4 is allocated in the inappropriate example in FIG. 7.

According to FIG. 8, in such a case, after allocating the page area 300 of the third page (Page #3), the capacity of the ring buffer 210 is insufficient to allocate the page area 300 of the next fourth page (Page #4). Therefore, to release the page area 300-1 of the first page (Page #1) is required. Here, as compared with FIG. 4, the remaining memory capacity is wasted as compared to the case where the first page (Page #1) is written from the head of the ring buffer 210.

On the other hand, in the image forming apparatus 1 according to the embodiment of the present disclosure, a storage unit 19 that is set with a ring buffer 210; a page area setting unit 100 that allocates a maximum-sized page area 300 for each page of a job in the ring buffer 210 set in the storage unit 19; a band storing unit 110 that stores band data 400 while compressing in the page area 300 allocated in the page area setting unit 100; and an image processing unit 11 that performs image processing of the band data 400 stored by the band storing unit 110; wherein the page area setting unit 100 determines whether or not the page has high possibility to be reused, and when having the high possibility to be reused, allocates the page area 300 at a head of the ring buffer 210. Further, the image forming apparatus 1 may include an image forming unit 17 that forms an image of the band data 400 image-processed by the image processing unit 11.

With this configuration, although if there is a high possibility that the page is to be reused and the memory start position is not the head of the ring buffer 210 in the time that the memory for the first page is allocated, the start position is set to the head. As a result, the storage capacity of the ring buffer 210 can be used efficiently. In other words, by reducing the possibility of the situation as shown in FIG. 8, to allocate the page area 300 that is highly likely to be reused in the ring buffer 210 is possible. Therefore, printing performance can be improved.

Further, in the image forming apparatus 1 according to the embodiment of the present disclosure, the page area setting unit 100 determines that there is a high possibility to be reused when the copy printing is set for the job.

With such a configuration, the storage capacity of the ring buffer 210 can be efficiently used by setting the start position of the page area 300 to the head of the ring buffer 210 at the time of the copy printing. That is, when printing multiple copies, the band data 400 of the page area 300 in the allocated state is read out, and the second and subsequent copies can be printed at high speed.

Further, in the image forming apparatus 1 according to the embodiment of the present disclosure, the page area setting unit 100 waits until being released when the head of the ring buffer 210 is in use although determined that the possibility to be reused is high.

With this configuration, the storage capacity of the ring buffer 210 can be efficiently used even if the head is released. Therefore, the possibility that the performance is improved in copy printing, or the like, can be increased.

Further, in the image forming apparatus 1 according to the embodiment of the present disclosure, the page area setting unit 100 releases the page area 300 from the first page when the page area 300 of the maximum size cannot be allocated in the ring buffer 210.

With this configuration, efficient use of the storage capacity of the ring buffer 210 can be archived in addition to minimize the reduction in print performance.

Other Embodiments

In addition, in the embodiment of the present disclosure, an example in which the band storing unit 110 is executed by the control unit 10 has been described.

However, the image processing unit 11 may compress the band data 400 and store it in the ring buffer 210. Further, the image processing unit 11 may be able to further store the band data 400 after the image processing in the ring buffer 210.

With this configuration, it is possible to cope with a flexible configuration relating to image processing and securing of a band storage area.

Further, in the above-described embodiment, an example in which the head (beginning) address of the ring buffer 210 set in the storage unit 19a is set to the head has been described.

However, the head address of the ring buffer 210 may be changeable by a variable that refers to the offset value of the address in the memory space of the storage unit 19a, or the like. In this case, the address when the end is exceeded may be returned so that the address is read and written from the head address of the ring buffer 210. That is, it may be set to have a ring shape. Further, the address and the like of the memory management table may be changed corresponding to the offset value.

With this configuration, when the top page is released, the page area 300 can be easily allocated from the head. Therefore, a flexible memory configuration can be supported.

In the above-described embodiment, the ring buffer 210 is described as an example in which the page area 300 is allocated from a small address to a large address (ascending order) in the memory space.

However, in the ring buffer 210, the page area 300 may be allocated from a large address to a small address (descending order). In either case, the address at which the page area 300 is initially allocated can be set as the "head".

In the above-described embodiment, an example is described in which the page area 300 is deleted from the first page when the page area 300 having a capacity exceeding the end of the ring buffer 210 cannot be allocated.

However, when the head of the ring buffer 210 is not in use, the area to the end and the area from the head to the remaining (free) portion may be allocated. That is, the page area 300 may be allocated so as to straddle the end and the head. In this case, the area may be allocated in the maximum capacity of the band data 400, that is, in the capacity unit of the band data 400 having the lowest compression rate.

Further, in the above-described embodiment, an example in which the entire page area 300 of the first page is released has been described, but the release may be performed in units of band data 400.

With this configuration, the storage capacity of the ring buffer 210 can be used more effectively.

In the above-described embodiment, it has been described that the ring buffer 210 allocates all the page areas 300 of each page of the job data 200 and then stores the band data 400 and performs image processing.

However, the page area 300 of one page may be allocated and then the band data 400 may be stored while being compressed. Then, image processing may be performed and page area 300 of the next page may be allocated. Alternatively, after the page area 300 of one page is allocated and the band data 400 is stored while being compressed, the page area 300 of the next page is allocated and image processing is performed by the image processing unit 11 concurrently with it.

With this configuration, efficiently perform processing is possible depending on the job status.

In the above embodiment, the storage capacity of the ring buffer 210 is fixed, but it may be variable.

As a result, the storage capacity of the ring buffer 210 can be utilized more flexibly.

In addition, the present disclosure can also be applied to information processing apparatuses other than the image forming apparatus. That is, the configuration may be such that a network scanner, a server, or the like, to which the scanner is separately connected by USB, or the like, is used.

Further, it is needless to say that the configurations and operations of the above-described embodiments are examples and can be appropriately modified and executed without departing from the aim of the present disclosure.

What is claimed is:

1. An image processing apparatus comprising:
a storage unit configured to be set with a ring buffer;
a page area setting unit configured to allocate a maximum-sized page area for each page of a job in the ring buffer set in the storage unit;
a band storing unit configured to store band data while compressing in the page area allocated by the page area setting unit; and
an image processing unit configured to perform image processing of the band data stored by the band storing unit; wherein
the page area setting unit determines whether or not the page has high possibility to be reused, and when having the high possibility to be reused, allocates the page area at a head of the ring buffer.

2. The image processing apparatus according to claim 1, wherein
the page area setting unit determines that the high possibility to be reused when a copy printing is set for the job.

3. The image processing apparatus according to claim 1, wherein
the page area setting unit waits until being released when the head of the ring buffer is in use although being determined that the possibility to be reused is high.

4. The image processing apparatus according to claim 1, wherein
the page area setting unit releases the page area from a first page when the maximum size page area is not possible to be allocated in the ring buffer.

5. An image forming apparatus comprising:
a storage unit configured to be set with a ring buffer;
a page area setting unit configured to allocate a maximum-sized page area for each page of a job in the ring buffer set in the storage unit;
a band storing unit configured to store band data while compressing in the page area allocated by the page area setting unit;
an image processing unit configured to perform image processing of the band data stored by the band storing unit; and
an image forming unit configured to form an image of the band data performed image processing by the image processing unit; wherein
the page area setting unit determines whether or not the page has high possibility to be reused, and when having the high possibility to be reused, allocates the page area at a head of the ring buffer.

6. The image forming apparatus according to claim 5, wherein
the page area setting unit determines that the high possibility to be reused when a copy printing is set for the job.

7. The image forming apparatus according to claim 5, wherein
the page area setting unit waits until being released when the head of the ring buffer is in use although being determined that the possibility to be reused is high.

8. The image forming apparatus according to claim 5, wherein
the page area setting unit releases the page area from a first page when the maximum size page area is not possible to be allocated in the ring buffer.

9. An image processing method being executed by an image processing apparatus, comprising the steps of:
setting a ring buffer;
allocating a maximum-sized page area for each page of a job in the ring buffer that is set;
determining whether or not the page has high possibility to be reused, and when having the high possibility to be reused, allocating the page area at the head of the ring buffer;
storing band data while compressing in the page area that is allocated; and
performing image processing of the band data that is stored.

10. The image processing method according to claim 9, wherein
determining that the high possibility to be reused when a copy printing is set for the job.

11. The image processing method according to claim 9, wherein
waiting until being released when the head of the ring buffer is in use although being determined that the possibility to be reused is high.

12. The image processing method according to claim 9, wherein
releasing the page area from a first page when the maximum size page area is not possible to be allocated in the ring buffer.

* * * * *